United States Patent
Nagata

(10) Patent No.: US 7,187,271 B2
(45) Date of Patent: Mar. 6, 2007

(54) OPERATIONAL OMISSION ALARM SYSTEM AND APPARATUS FOR VEHICLE

(75) Inventor: Asako Nagata, Chita (JP)

(73) Assignee: Denso Corporation, Kariya (JP)

( * ) Notice: Subject to any disclaimer, the term of this patent is extended or adjusted under 35 U.S.C. 154(b) by 115 days.

(21) Appl. No.: 11/063,394

(22) Filed: Feb. 23, 2005

(65) Prior Publication Data
US 2005/0184862 A1 Aug. 25, 2005

(30) Foreign Application Priority Data
Feb. 25, 2004 (JP) ............................ 2004-049549

(51) Int. Cl.
*B60Q 1/00* (2006.01)
(52) U.S. Cl. .................... 340/438; 340/457; 340/457.2
(58) Field of Classification Search ................ 340/438, 340/457, 457.2, 457.3, 458, 459, 460, 461, 340/539.1
See application file for complete search history.

(56) References Cited

U.S. PATENT DOCUMENTS 6,801,124 B2 * 10/2004 Naitou ................... 340/426.19
6,956,467 B1 * 10/2005 Mercado, Jr. ............ 340/426.2

FOREIGN PATENT DOCUMENTS

| CN | 2384813 Y | 6/2000 |
|---|---|---|
| CN | 1266789 | 9/2000 |
| JP | 10273016 A * | 10/1998 |
| JP | 2001-219817 | 8/2001 |
| JP | 2002-187527 | 7/2002 |

* cited by examiner

Primary Examiner—Toan N. Pham
(74) Attorney, Agent, or Firm—Harness, Dickey & Pierce, PLC

(57) ABSTRACT

An operational omission alarm system for a vehicle includes an alarm apparatus, at least one terminal device, and a central server. The alarm apparatus is located on the vehicle for determining whether at least one operational omission remains after a user of the vehicle has left the vehicle and for sending an alarm signal to a network when detecting the existence of the at least one operational omission. The at least one terminal device is separately assembled from the vehicle for notifying the user of the existence of the at least one operational omission in accordance with the alarm signal sent by the alarm apparatus. The central server is for registering the at least one terminal device and receiving the alarm signal sent by the alarm apparatus and for transferring the alarm signal to the at least one terminal device.

12 Claims, 4 Drawing Sheets

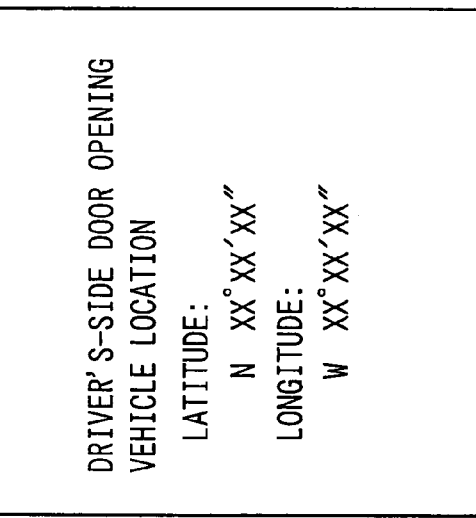
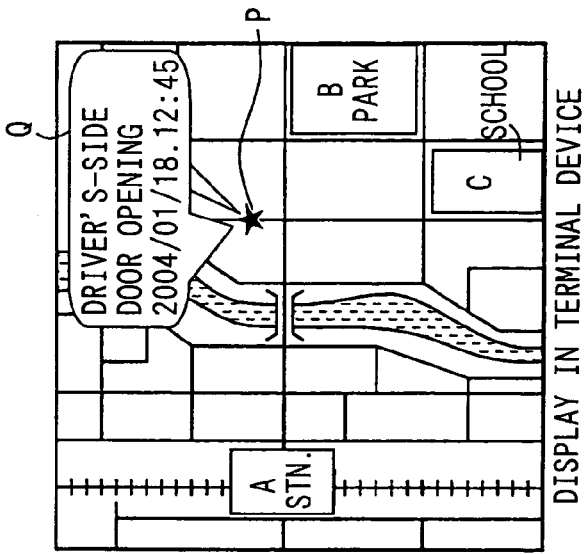
FIG. 4A
FIG. 4B

OPERATIONAL OMISSION ALARM SYSTEM AND APPARATUS FOR VEHICLE

CROSS REFERENCE TO RELATED APPLICATION

This application is based upon and claims the benefit of priority of Japanese Patent Application No. 2004-049549 filed on Feb. 25, 2004, the content of which is incorporated herein by reference.

FIELD OF THE INVENTION

The present invention relates to an operational omission alarm system and apparatus for a vehicle and, more particularly, to an operational omission alarm system and apparatus capable of notifying a vehicle user of the existence of an operational omission after the user has left the vehicle.

BACKGROUND OF THE INVENTION

A conventional operational omission alarm system for a vehicle determines whether all headlights and position lamps are turned off when the driver removes a key from the vehicle. If any one of the head lights or position lamps remains on, the alarm system notifies the user of the vehicle that some operational omission remains. The notice may take the form of an audible beep from a speaker located in a compartment of the vehicle and/or an illuminated an alarm indicator equipped on an instrument panel.

Japanese patent document JP2002-187527A discloses another operational omission alarm system, which informs the user of the existence of an operational omission when the key is left in the vehicle but, the user has removed a mobile phone from an interface located on the vehicle. If the key is left behind, the operational omission alarm system notifies the user.

However, the alarm beep and/or the alarm display cannot always notify the user of the operational omission successfully if the user is in a hurry and/or occupied with thinking about something else when departing the vehicle. More specifically, the conventional operational omission alarm system cannot inform the user of the existence of an operational omission after the user has left the vehicle. For example, the continued presence of an operational omission such as an open door and/or an open window after the user has left the vehicle may induce theft of the vehicle or items in the vehicle and/or entry of rainwater into the vehicle. If the operational omission includes illuminated headlights, position lamps, and/or cabin lamps, the operational omission can cause battery exhaustion.

That is, the conventional operational omission alarm system informs the user of the operational omission with an audible beep and/or visual display such that it is hard for the user to take adequate measures after the user has left the vehicle.

SUMMARY OF THE INVENTION

An object of the present invention is to provide an operational omission alarm system and apparatus for a vehicle, which can adequately inform the user of the existence of an operational omission after the user has left the vehicle to prevent accidents caused by such operational omissions.

To achieve the above object, the operational omission alarm system includes an alarm apparatus, at least one terminal device, and a central server. The alarm apparatus is located on the vehicle for determining whether at least one operational omission remains after a user of the vehicle has left the vehicle and for sending an alarm signal to a network when detecting the existence of the at least one operational omission. The at least one terminal device is separately assembled from the vehicle for notifying the user of the existence of the at least one operational omission in accordance with the alarm signal sent by the alarm apparatus. The central server is for registering the at least one terminal device and receiving the alarm signal sent by the alarm apparatus and for transferring the alarm signal to the at least one terminal device.

Other features and advantages of the present invention will be appreciated, as well as methods of operation and the function of the related parts, from a study of the following detailed description, the appended claims, and the drawings, all of which form a part of this application. In the drawings:

BRIEF DESCRIPTION OF THE DRAWINGS

FIG. 4A is a front view of a display on a terminal device of the operational omission alarm system and apparatus of FIG. 1 providing a textual alarm; and FIG. 4B is a front view of a display on a terminal device of the operational omission alarm system and apparatus of FIG. 1 providing a graphical alarm.

DESCRIPTION OF THE PREFERRED EMBODIMENTS

Figure 1:
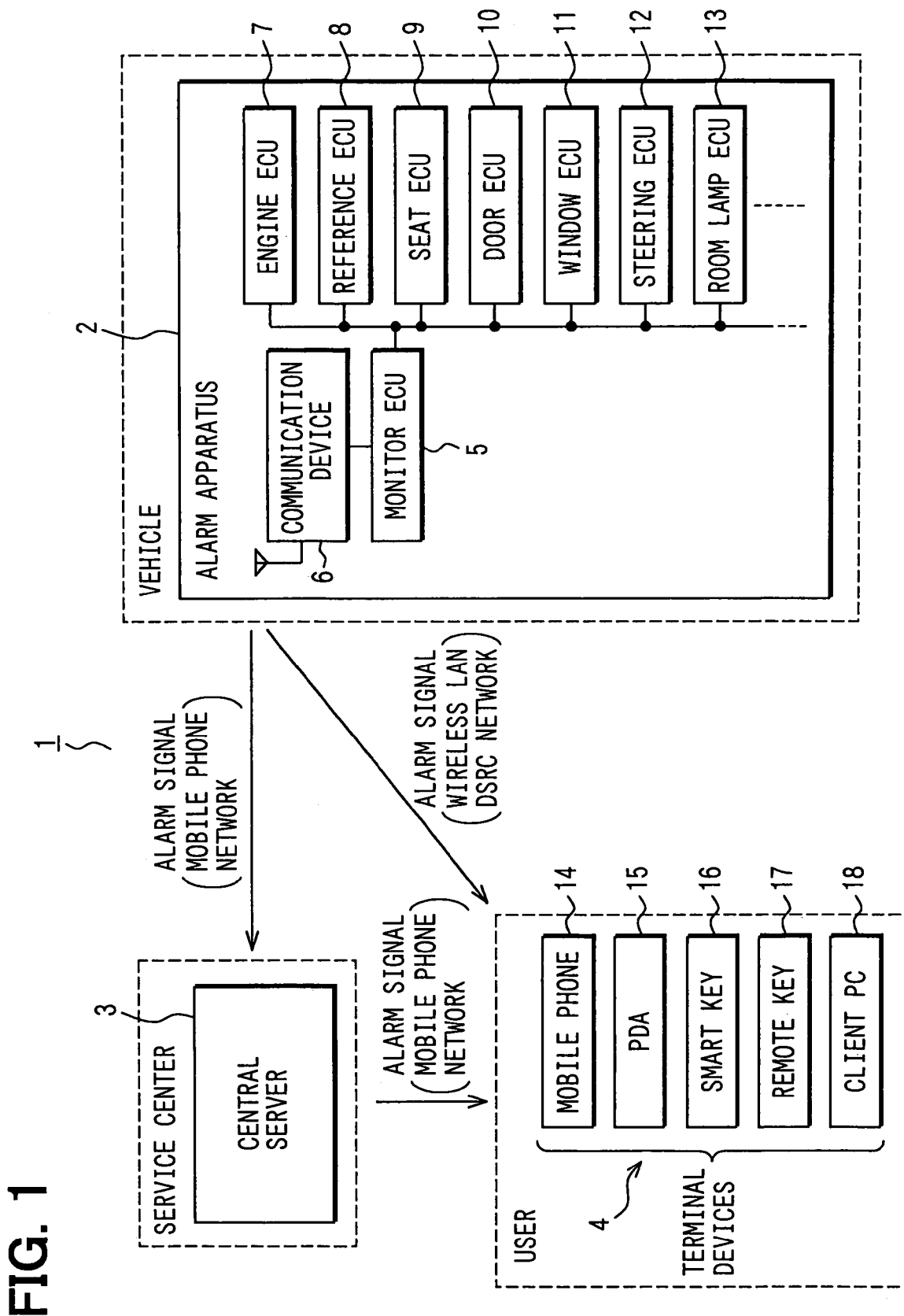
FIG. 1 is a block diagram of an operational omission alarm system and apparatus according to an embodiment of the present invention.

FIG. 1 generally depicts an entire composition of an operational omission alarm system 1 according to an embodiment of the present invention. The operational omission alarm system 1 generally has an alarm apparatus 2 located on a vehicle, a central server 3 located in a service center, and terminal devices 4 held by a user of the vehicle.

The alarm apparatus 2 has a monitor electronic control unit (ECU) 5, which may also be referred to hereinafter as a controller, a communication device 6, which may also be referred to hereinafter as a communicator, an engine ECU 7, a reference ECU 8, a seat ECU 9, a door ECU 10, a window ECU 11, a steering ECU 12 and a cabin lamp ECU 13.

The monitor ECU 5 monitors ECUs 7 to 13 and determines whether an operational omission criterion is satisfied based on detection signals inputted by the ECUs 7 to 13. When the monitor ECU 5 determines that an operational omission criterion is satisfied, the monitor ECU 5 further determines whether any operational omission remains based on the detection signals inputted by the ECUs 7 to 13.

The communication device 6 is configured with a mobile phone, a wireless local area network (LAN) communicator, a dedicated short range communication (DSRC) communicator, etc. When the communication device 6 receives an input signal of a transmission request from the monitor ECU 5, it sends an alarm signal via a mobile phone network to the central server 3, and via the wireless LAN or the DSRC network to the terminal devices 4. The communication device 6 stores time and vehicle location information derived by cooperation with a navigation system located on the vehicle.

The engine ECU 7 is for controlling the operation of an engine of the vehicle. The reference ECU 8 is for detecting whether a smart key for a smart key system, which enables the user to unlock doors and start the engine of the vehicle without using a standard key, is within a communication distance. The seat ECU 9 is for detecting whether the seat sensor is turned on. The door control ECU 10 is for detecting whether doors of the vehicle are closed and locked. The window control ECU 11 is for detecting whether windows of the vehicle are closed. The steering ECU 12 is for detecting whether a key of the vehicle is set in a key cylinder of the vehicle. The cabin lamp ECU 13 is for detecting whether cabin lamps of the vehicle remain on. Each of the ECUs 7 to 13 sends a detection signal to the monitor ECU 5 each time the respective condition is detected.

In the above configuration, some functions of the alarm apparatus 2 can be provided by the navigation system. The alarm apparatus 2 is configured to receive an electric supply from a battery of the vehicle, so as to continue operating even while a main power switch of the vehicle is turned off. It is desirable that the alarm apparatus 2 can operate with small power consumption while the main power switch is turned off, so as not to consume a large quantity of electric power from the battery.

The terminal devices 4 are implemented with devices such as a mobile phone 14, a personal digital assistant (PDA) 15, a smart key 16 for the smart key system, a remote key 17 for a keyless entry system, and a client personal computer 18. When the central server 3 receives the alarm signal sent by the alarm apparatus 2, it sends the alarm signal via a mobile phone network to the terminal device 4, which is registered in advance. When the terminal device 4 receives the alarm signal sent from the central server 3, it notifies the user of the existence of an operational omission by alarm. The alarm may include a display on a monitor of the terminal device, a beep, and/or a vibration. In one embodiment, each different type of alarm may correspond to a specific operational omission detected.

Figure 2:
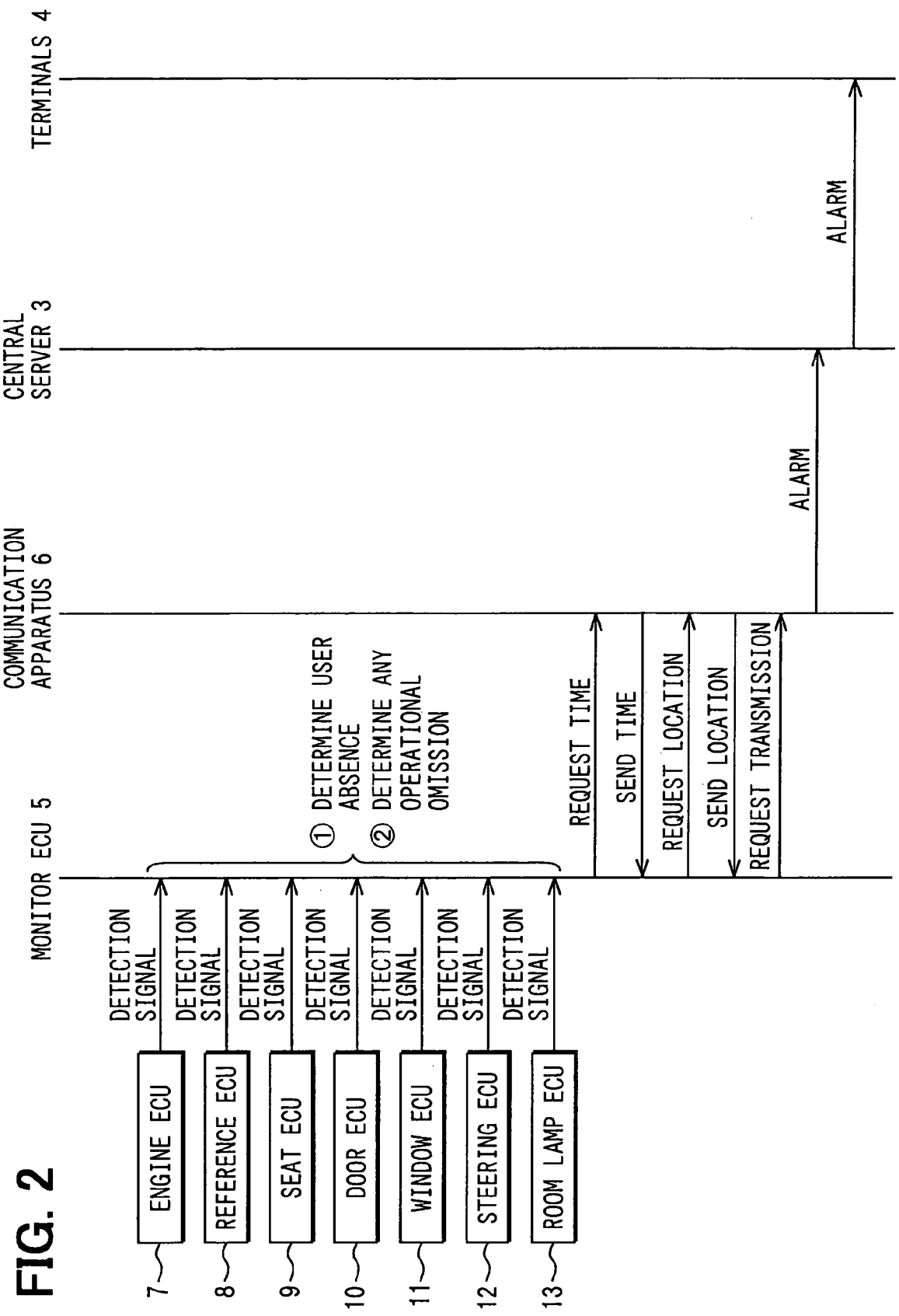
FIG. 2 is a sequence chart illustrating processes performed by the operational omission alarm system and apparatus of FIG. 1.
Figure 3:
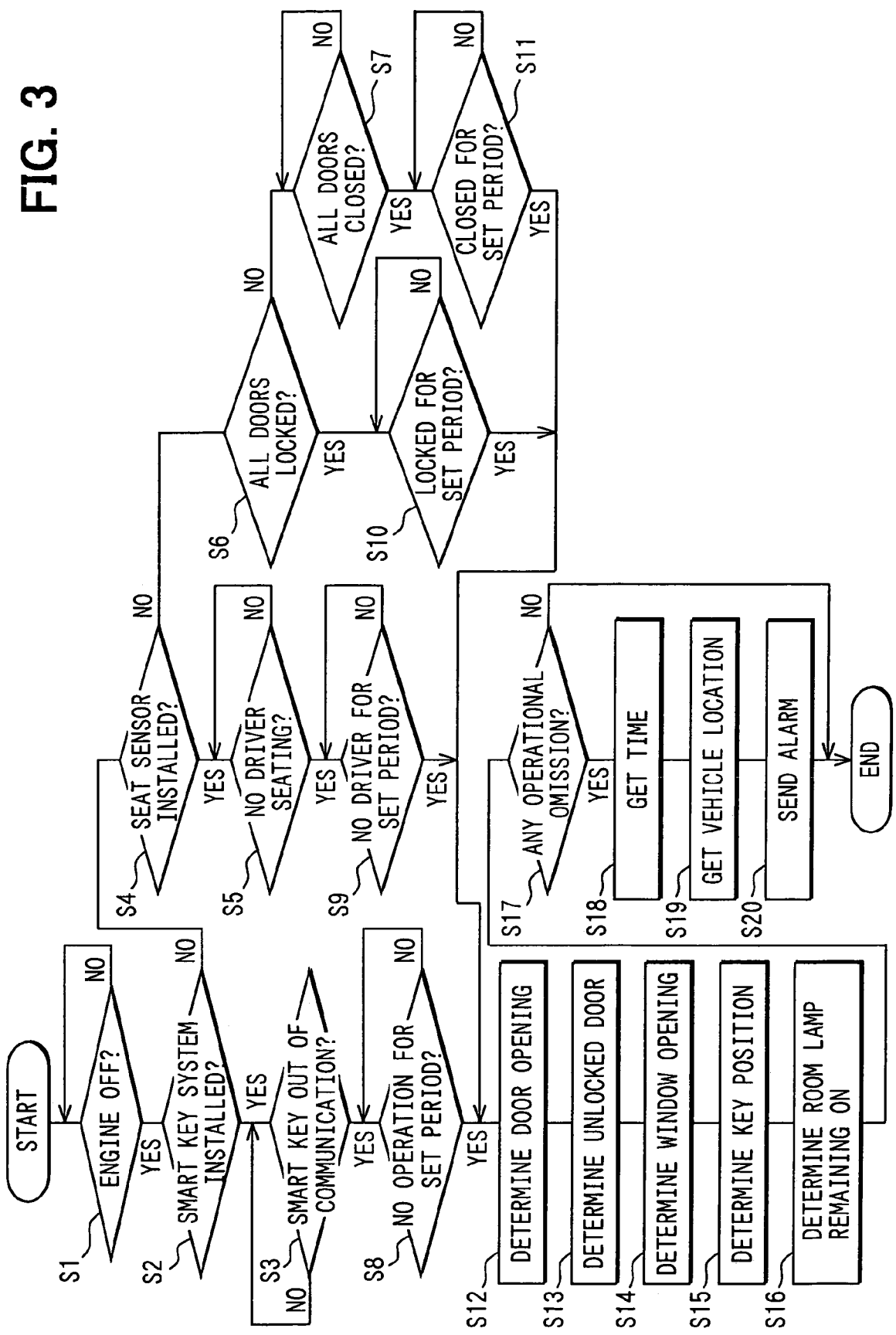
FIG. 3 is a flowchart of processes performed by the operational omission alarm system and apparatus of FIG. 1.

FIGS. 2–4 depict a process performed by the operational omission alarm system 1 and alarm apparatus 2 described above. In the embodiment described, the alarm apparatus 2 sends the alarm signal via the central server 3 to the terminal device 4. FIG. 2 depicts a sequence chart of the processes performed between the alarm apparatus 2, the central server 3 and the terminal devices 4. FIG. 3 depicts a flowchart of the process performed by the monitor ECU 5 of the alarm apparatus 2.

Referring to FIG. 3, the monitor ECU 5 first determines whether the vehicle is unattended by the user. Specifically, the monitor ECU 5 determines whether the engine is turned off based on the detection signal sent by the engine ECU 7. If the monitor ECU 5 determines the engine is off (Yes in step S1 of FIG. 3), the monitor ECU 5 determines in step S2 whether the smart key system is installed in the vehicle.

If Yes in step S2, the monitor ECU 5 determines in step S3 whether the smart key 16 is out of the communication distance based on the detection signal sent by the reference ECU 8.

If No in step S2, the monitor ECU 5 determines in step S4 whether the seat sensor is installed in the vehicle. If Yes in step S4, the monitor ECU 5 determines in step S5 whether the seat sensor detects no driver based on the detection signal sent by the seat ECU 9. If No in step S4, the monitor ECU 5 determines in step S6 whether all the doors are locked based on the detection signal sent by the door control ECU 10. If No in step S6, the monitor ECU 5 determines in step S7 whether all the doors are closed based on the detection signal sent by the door control ECU 10.

If Yes in step S3, the monitor ECU 5 determines in step S8 whether no operation with the smart key continues for a predetermined period of time. If Yes in step S8, the monitor ECU 5 determines in steps S12 to S17 whether any operational omission remains.

If Yes in step S5, the monitor ECU 5 determines in step S9 whether no driver is seated for a predetermined period of time. If Yes in step S9, the monitor ECU 5 determines in steps S12 to S17 whether any operational omission remains.

If Yes in step S6, the monitor ECU 5 determines in step S10 whether all the doors have remained locked for a predetermined period of time. If Yes in step S7, the monitor ECU 5 determines in step S11 whether all the doors have remained closed for a predetermined period of time. If Yes in step S10 or S11, the monitor ECU 5 determines in steps S12 to S17 whether any operational omission remains.

The above-described predetermined periods referred to in steps S8 to S11 can be set to a value equal to one another or to values different from one another. The user can set the predetermined periods with the navigation system or terminal device 4 such as the mobile phone 14 and client personal computer 18. Alternatively, a clerks or staff-member at a car dealership, shop, or factory may set the predetermined periods at the request of the user.

The criteria for determining whether the vehicle is unattended by the user may alternatively include other combinations of the above branches of steps S1 to S11. For example, the criteria may require a combination of the branches of steps S1, S2, S3, S6 and S10. In this configuration, the vehicle would be deemed unattended only when all the door keep locked for the predetermined period of time after when the smart key remains located outside of the communication distance for another predetermined period of time. In another example, the criteria may include a combination of the branches of steps S1, S4, S5, S9, S6 and S10. In this configuration, the vehicle would be deemed to be unattended when all the doors have been locked for the predetermined period of time only after the seat sensor has not detected a driver for another predetermined period of time.

After the monitor ECU 5 determines that the vehicle is unattended by the user according to one of the criteria described above or similar criteria, the monitor ECU 5 determines whether any operational omission remains. Specifically, the monitor ECU 8 determines in step S12 whether any door is open based on the detection signal sent by the door control ECU 10. Next, the monitor ECU 8 determines in step S13 whether any door is unlocked based on the detection signal sent by the door control ECU 10. Then, the monitor ECU 8 determines in step S14 whether any window is open based on the detection signal sent by the window control ECU 11. Further, the monitor ECU 8 determines in step S15 whether the key of the vehicle is set in a key cylinder of the vehicle based on the detection signal sent by the steering ECU 12. Furthermore, the monitor ECU 8 determines in step S16 whether cabin lamps of the vehicle remain illuminated based on the detection signal sent by the cabin lamp ECU 13.

The monitor ECU 5 determines in step S17 whether any operational omission remains based on determinations in steps S12 to S16. If Yes in step S17, the monitor ECU 5 requests in step S18 that the communication apparatus 6 send the current time to the monitor ECU 5. The monitor ECU 5 then receives the current time therefrom. Then the monitor ECU 5 requests in step S19 that the communication apparatus 6 to send the current location of the vehicle to the monitor ECU 5. The monitor ECU 5 then receives the current location therefrom. Finally, the monitor ECU 8 requests in step S20 that the communication apparatus 6 send the alarm signal including information identifying any remaining operational omission(s), the current time, and the current location of the vehicle to the central server 3.

The central server 3 receives the alarm signal sent by the communication apparatus 6 and sends it to the terminal device(s) 4, which is registered in advance as described above. If the user has a plurality of the terminal devices 4 as in this embodiment, the user can receive the alarm signal with a designated one(s) of the terminal device(s) 4 by registering the one(s) of the terminal device(s) 4 to receive the alarm signal to the central server 3 in advance. Thus, the alarm signal received by the terminal device(s) 4 can notify the user of the existence of the operational omission.

In the above process, each of the alarm signals sent between the alarm apparatus 2 located on the vehicle and the central server 3, as well as between the central server 3 and the terminal devices 4 can be transmitted via simple mail transfer protocol (SMTP) used in TCP/IP network (internet e-mail) or via short message service (SMS) used in mobile phone network, for example.

In the above embodiment, the criteria for determining whether the vehicle is unattended by the user is based on whether the smart key 16 remains outside of the communication distance for a predetermined period of time, whether no driver has been seated in the vehicle for a predetermined period of time, whether all the doors have been locked for a predetermined-period of time, and whether all the doors have been closed for a predetermined period of time. However, it should be appreciated that the criteria are not limited to the above branches. For example, the criteria may also include a condition that the key of the vehicle has been removed from the key cylinder for a predetermined period of time.

In the above embodiment, the criteria for determining whether any operational omission remains includes whether any door is open, whether any door is unlocked, whether any window is open, whether the key of the vehicle is set in the key cylinder, and whether any cabin lamps remain illuminated. The criteria may also include other conditions, for example, whether any one of headlights, position lamps, turn signal lamps, or fog lamps of the vehicle are illuminated and/or whether any one of an engine hood, a trunk lid or a sunroof is opened.

In the above embodiment, the alarm apparatus 2 sends the alarm signal via the central server 3 to the terminal devices 4 registered by the user in advance. The alarm apparatus 2 located on the vehicle may send the alarm directly to the terminal device(s) 4 by registering the terminal device(s) 4 in the alarm apparatus 2. In this situation, the alarm signals sent from the alarm apparatus 2 to the terminal devices 4 can be transmitted via simple mail transfer protocol (SMTP) used in TCP/IP network (internet e-mail) or via short message service (SMS) used in mobile phone network, for example.

The operational omission alarm system 1 may allow the user to choose the transmission path of the alarm signal from the alarm apparatus 2 to the terminal devices 4 between a path via the central server 3 and a direct path. In this situation, the user can choose the transmission path by registering the path in the alarm apparatus 2 in advance. The alarm apparatus 2 may be configured to send the alarm signal to the central server 3 when the alarm apparatus 2 does not complete a normal transmission of the alarm signal to the terminal device(s) 4. For example, when the alarm apparatus 2 fails sending the alarm signal to the terminal device(s) 4. Alternatively, the alarm apparatus 2 may be configured to send the alarm signal directly to the terminal device(s) 4 when the alarm apparatus 2 fails to complete a normal transmission of the alarm signal to the central server 3. For example, when the alarm apparatus 2 fails sending the alarm signal to the central server 3. The alarm apparatus 2 may also be configured to detect the radio condition of each the path before sending the alarm signal and send the alarm signal via the path having the better radio condition.

When the central server 3 receives the alarm signal including information identifying the current vehicle location from by the alarm apparatus 2, the central server 3 may send the current vehicle location to the terminal device(s) 4 in a textual expression as shown in FIG. 4A or a graphical expression as shown in FIG. 4B. In this situation, the central server 3 obtains geographical data surrounding the current vehicle location sent by the alarm apparatus 2, overwrites a symbol ("P" in FIG. 4B) denoting the present location in the geographical data, and sends the graphical data to the terminal device(s) 4 as the alarm signal. As shown in FIG. 4B, the central server 3 may also identify the specific operational omission and/or the time ("Q" in FIG. 4B) when the alarm apparatus 2 sent the alarm signal together with the above symbol in the geographical data, and sends the graphical data to the terminal device(s) 4 as the alarm signal.

The operational omission alarm system 1 and the alarm apparatus 2 therein according to this embodiment have the following advantages.

The alarm apparatus 2 of the operational omission alarm system 1 can inform the user of the vehicle that any operational omission remains when the user has left the vehicle omitting any operation to risk the vehicle. The alarm apparatus 2 determines whether any operational omission remains after the user has left the vehicle and sends the alarm signal via the central server 3 to the terminal device(s) 4 upon detecting any operational omission. Thus, the user can take adequate measures such as returning to the vehicle by himself/herself and/or calling and asking someone, for example, a security staff of a security service company to rush to the location of the vehicle to prevent a trouble caused by the operational omission.

The alarm apparatus 2 in the operational omission alarm system 1 can inform the user of the vehicle of the operational omission also by sending the alarm signal directly to the terminal device(s) 4. Thus, the user can take adequate measures even when trouble or an operation error exists in the central server 3 and/or in the event the network to and from the central server 3 become congested.

The alarm apparatus 2 can send the alarm signal including the time when the operational omission was detected together with the kind of operational omission to the center server 3 and directly to pre-registered terminal device(s) 4. Thus, the user of the vehicle can be informed of the time when the operational omission is detected together with the kind of operational omission that exists. This allows the user to use the information in determining whether to return to the vehicle immediately or simply wait until a later time.

The alarm apparatus 2 can send the alarm signal informing the current vehicle location together with the kind of the operational omission to the center server 3 and directly to the pre-registered terminal device(s) 4. Thus, the user of the vehicle can be informed of the current vehicle location together with the kind of operational omission in existence to determine whether to return to the vehicle by himself/ herself or to call another person for assistance based on their relative positions to the vehicle.

The operational omission alarm system 1 and the alarm apparatus 2 of the present invention is surely not limited to the above embodiment. For example, the embodiment can be modified and/or extended as follows.

The service center may have operators who confirm the alarm signal sent from the alarm apparatus 2 to the central server 3 and send the information notified by the alarm signal manually to the terminal devices 4 or directly to the user of the vehicle by making a phone call.

The time of the detected omission and the current vehicle location may be retained not only by the communication device 6, but also by the monitor ECU 5. The alarm apparatus 2 may send the alarm signal identifying only the kind of operational omission in existence and then send subsequent alarm signal(s) identifying the time when the operational omission was detected, as well as the current vehicle location.

The alarm signal may also include recommended steps for the user to take in response to the existence of each of the operational omissions.

The alarm apparatus 2 may send the alarm signal simultaneously to both to the central server 3 and the terminal device(s) 4.

The alarm signal sent from the alarm apparatus 2 to the terminal device(s) 4 may be via a communication network used for the keyless entry system.

The terminal device(s) 4 may present the alarm signal to the user by lighting or flashing an indicator lamp such as a light-emitting diode (LED). However, it is better to transform the operational omission information into encrypted data such as a code to improve the security in a configuration that includes the terminal device(s) 4 displaying the operational omissions information.

It should be appreciated that this description of the present invention is merely exemplary in nature and, thus, variations that do not depart from the gist of the invention are intended to be within the scope of the invention. Such variations are not to be regarded as a departure from the spirit and scope of the invention.

What is claimed is:

1. An operational omission alarm system for a vehicle comprising:
    an alarm apparatus located on the vehicle for determining whether at least one operational omission remains after a user of the vehicle has left the vehicle and for sending an alarm signal to a network when detecting the existence of the at least one operational omission;
    at least one terminal device separately assembled from the vehicle for notifying the user of the existence of the at least one operational omission in accordance with the alarm signal sent by the alarm apparatus; and
    a central server for registering the at least one terminal device, the central server for receiving the alarm signal sent by the alarm apparatus and for transferring the alarm signal to the at least one terminal device.

2. The operational omission alarm system according to claim 1, wherein the alarm apparatus determines that the user has left the vehicle when:
    a communication device transits a signal to the central server indicating that a smart key, which is used for a smart key system located on the vehicle, has not been located within a communication distance from the vehicle for a predetermined period of time;
    the communication device transmits a signal to the central server indicating that no driver has been seated in the vehicle for a predetermined period of time;
    the communication device transmits a signal to the central server indicating that all doors of the vehicle have been locked for a predetermined period of time; and
    the communication device transmits a signal to the central server indicating that no piece of a plurality of pieces of equipment on the vehicle have been operated within a predetermined period of time after detecting that all the doors on the vehicle were closed.

3. The operational omission alarm system according to claim 1,
    wherein the alarm apparatus determines that the at least one operational omission remains upon detecting at least one of:
    an open door;
    an unlocked door;
    an open window;
    a key remaining in a key cylinder of the vehicle;
    a cabin lamps being illuminated;
    at least one of a headlight, a position lamp, a turn lamp, and fog a lamp being illuminated; and
    at least one of an engine hood, a trunk hood, and a sunroof being unlatched.

4. The operational omission alarm system according to claim 1, wherein:
    the alarm apparatus retrieves a current time upon determining that the at least one operational omission remains and sends the current time together with the alarm signal; and
    the central server transfers the current time together with the alarm signal to the terminal device that is registered therewith when receiving the alarm signal sent by the alarm apparatus.

5. The operational omission alarm system according to claim 1, wherein:
    the alarm apparatus retrieves a current location of a vehicle upon determining that the at least one operational omission remains and sends the current location together with the alarm signal; and
    the central server transfers the current location of the vehicle together with the alarm signal to the terminal device that is registered therewith when receiving the alarm signal sent by the alarm apparatus.

6. The operational omission alarm system according to claim 5, the central server retrieves geographical information surrounding the current location of the vehicle when receiving the current location sent by the alarm apparatus, combines the current location and the geographical data, and transfers the geographical data together with the alarm signal to the terminal device registered therewith when receiving the alarm signal sent by the alarm apparatus.

7. An operational omission alarm system for a vehicle comprising:
    an alarm apparatus located on the vehicle for determining whether the at least one operational omission remains after a user of the vehicle has left the vehicle and for sending an alarm signal to a network upon detecting the existence of the at least one operational omission; and
    a terminal device separately assembled from the vehicle for notifying the user of the existence of the at least one operational omission in accordance with the alarm signal sent by the alarm apparatus.

8. An operational omission alarm apparatus for a vehicle comprising:
- a controller for determining whether at least one operational omission remains after a user has left the vehicle; and
- a wireless set for sending an alarm signal via a wireless communication network to a terminal device, which is separately assembled from the vehicle for notifying the user of the existence of the at least one operational omission in accordance with the alarm signal.

9. The operational omission alarm apparatus according to claim 8,
wherein the wireless set arranges the alarm signal to be received by a central server, which is separately located from the vehicle and for transferring the alarm signal to a terminal device separately assembled from the vehicle and for notifying the user of the existence of the at least one operational omission.

10. The operational omission alarm apparatus according to claim 8,
wherein the wireless set arranges the alarm signal to be received by the terminal device, which is separately assembled from the vehicle and for memorizing a destination for sending the alarm signal to the terminal device.

11. The operational omission alarm apparatus according to claim 8,
wherein the controller determines that the user has left the vehicle when:
- the controller determines that a smart key, which is used for a smart key system located on the vehicle, has not been located within a communication distance from the vehicle for a predetermined period of time;
- the controller determines that no driver has been seated in the vehicle for a predetermined period of time;
- the controller determines that all doors of the vehicle have been locked for a predetermined period of time; and
- the controller determines that no piece of a plurality of pieces of equipment on the vehicle have been operated within a predetermined period of time after detecting that all the doors on the vehicle were closed.

12. The operational omission alarm apparatus according to claim 8,
wherein the controller determines the any operational omission remains after the user has left the vehicle upon detecting at least one of:
- an open door;
- an unlocked door;
- an open window;
- a key remaining in a key cylinder of the vehicle;
- a cabin lamps being illuminated;
- at least one of a headlight, a position lamp, a turn lamp, and fog a lamp being illuminated; and
- at least one of an engine hood, a trunk hood, and a sunroof being unlatched.

* * * * *